United States Patent [19]

Mott

[11] 4,182,180
[45] Jan. 8, 1980

[54] ENTHALPY COMPARATOR

[75] Inventor: Richard C. Mott, Harwood Hts., Ill.

[73] Assignee: Honeywell Inc., Minneapolis, Minn.

[21] Appl. No.: 800,762

[22] Filed: May 26, 1977

[51] Int. Cl.$^2$ .......................................... G01K 17/00
[52] U.S. Cl. ............................... 73/336; 235/200 R; 236/44 C
[58] Field of Search ............. 73/336; 137/82; 165/16; 235/200 R, 200 WB, 201 ME; 236/44 C, 105

[56] References Cited

U.S. PATENT DOCUMENTS

| | | | |
|---|---|---|---|
| 2,494,673 | 1/1950 | Smith | 235/200 |
| 3,059,846 | 10/1962 | Vesper | 235/200 |
| 3,463,442 | 8/1969 | Lesklewicz et al. | 235/200 X |
| 3,913,344 | 10/1975 | Holloway et al. | 236/44 |

FOREIGN PATENT DOCUMENTS 121289  6/1959  U.S.S.R. .................................. 235/200

OTHER PUBLICATIONS

Mamzic, "Using Pneumatic Analog Computing Elements for Control" in Control Engineering, 9/61, pp. 105–110.

"12 Ways of Generating Control" in Control Engineering, 9/54, pp. 58–62.

Primary Examiner—Herbert Goldstein
Attorney, Agent, or Firm—Trevor B. Joike

[57] ABSTRACT

An enthalpy comparator for comparing the enthalpies of two bodies of air is disclosed having a first temperature sensor and a first humidity sensor for sensing the temperature and humidity respectively of the first body of air, a second temperature sensor and a second humidity sensor for sensing the temperature and humidity respectively of the second body of air, and a diaphragm module unit having a first diaphragm defined chamber connected to the first temperature sensor, a second diaphragm defined chamber connected to the second temperature sensor, a third diaphragm defined chamber connected to the first humidity sensor, and a fourth diaphragm defined chamber connected to the second humidity sensor, and an output sensing mechanism associated with the four chambers for providing an output dependent upon the enthalpies of the first and second bodies of air, and, in particular, the difference between the enthalpies of the first and second bodies of air. The areas of the diaphragms which define the first, second, third and fourth chambers are selected to yield a close approximation of the enthalpies of the two bodies of air.

20 Claims, 6 Drawing Figures

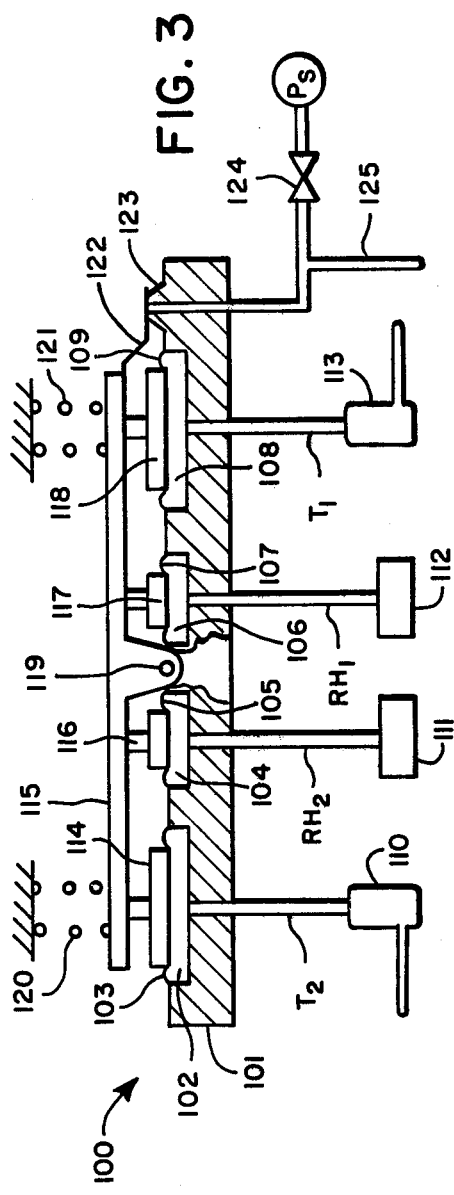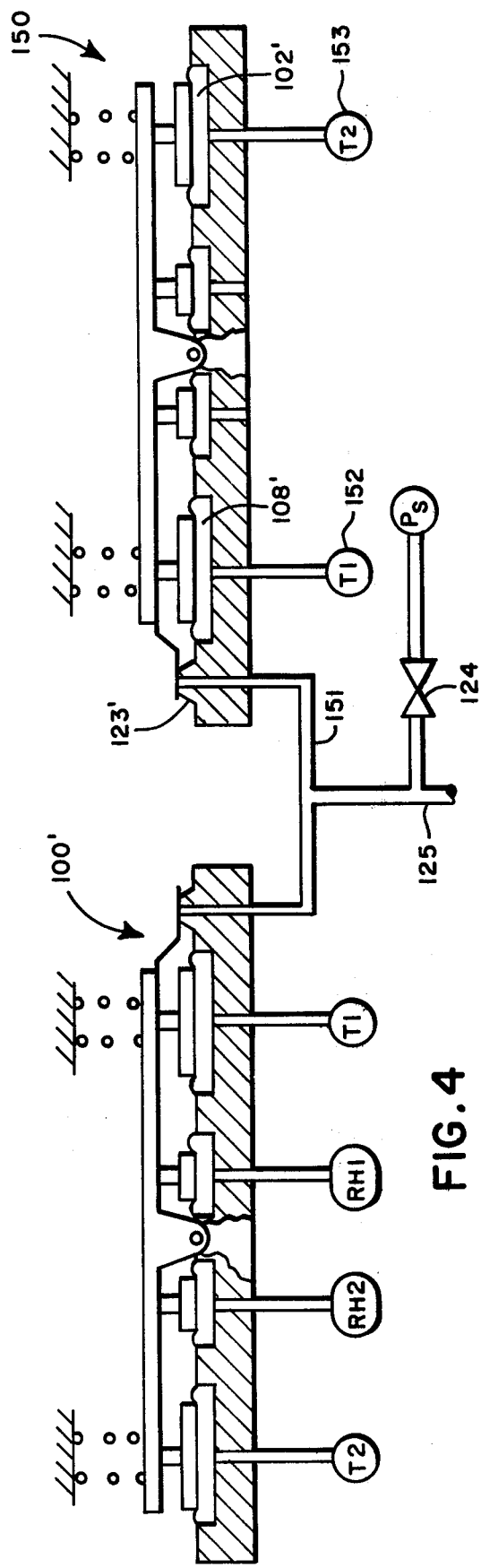

ENTHALPY COMPARATOR

BACKGROUND OF THE INVENTION

This invention relates to the comparison of the enthalpies of at least two bodies of air, and more particularly, to a diaphragm module arrangement connected to temperature and humidity sensors located in the two bodies of air for providing an output signal dependent upon these enthalpies.

In typical air conditioning systems, return air which is recirculated from the spaces being supplied with conditioned air is mixed with fresh air drawn from a source of outdoor air and is then filtered, de-humidified and controlled at a temperature sufficient to satisfy the needs of the spaces under control. The circulation of the air in the air conditioning system is controlled by operation of a fan. In modern day air conditioning systems, a so-called "economizer cycle" is used which relies upon outdoor air as a free source of cooling for those spaces requiring cool air. For example, in large office buildings which have both exterior zones or spaces and interior zones or spaces, the interior zones represent a cooling load to the air conditioning system during all months of the year, whereas the exterior zones represent a cooling load during summer months and a heating load during winter months. Therefore, under advantageous conditions, it is more economical to rely upon outdoor air, rather than a refrigeration unit, as a source of cooling for those zones which require cooling.

The function of the economizer cycle is to allow the introduction of outdoor air into the air conditioning system as long as the outdoor air is not too cold or too hot and/or too humid. The economizer cycle, therefore, requires the temperature and moisture content of both the outdoor air and the return air to be measured in order to make the decisions of when and how much outdoor air should be introduced into this system. For example, if the outdoor air is warmer than the return air, more energy would be required to cool the outdoor air than the return air; therefore, less outdoor air should be used. Alternatively, if the outdoor air is more humid than the return air, more energy would be required to dehumidify the outdoor air; therefore, less outdoor air should be used.

In making the decision of when and how much outdoor air should be used, it is preferable to measure the enthalpies of the outdoor air and return air since enthalpy is a function of the specific heat content and the latent heat content of a body of air, specific heat being related to dry bulb temperature and latent heat being related to humidity. The measurement of the enthalpy of a body of air gives the most accurate measurement of the de-humidification and either cooling or heating which would be necessary to control the air at a point to satisfy the requirements of the zones under control of the system.

As discussed in my co-pending application, Ser. No. 743,427, filed Nov. 19, 1976, in order to measure the enthalpy of air, prior art arrangements measure both the temperature and humidity of the outdoor air as well as the temperature and humidity of the return air. Such arrangements rely upon four sensors for providing this measurement of total heat, i.e., enthalpy, and have required the use of complex circuit arrangements in order to produce a reasonable approximation of enthalpy. These sensors have also been used together with computer programs for calculating enthalpy according to the prescribed enthalpy formula. In order to reduce the number of sensors required to measure this total heat or enthalpy, prior art systems have utilized wet bulb temperature sensors which, if one reviews the psychrometric chart, gives a fairly accurate indication of total heat or enthalpy. However, wet bulb temperature sensors are complex and require a constant source of water.

In my above noted application, I have disclosed an enthalpy calculator for calculating the enthalpy of air. However, when the enthalpies of at least two bodies of air are to be compared, the structure necessary to perform the comparison can be greatly simplified.

SUMMARY OF THE INVENTION

A diaphragm module unit has a first diaphragm defined chamber connected to a first temperature sensor for sensing the temperature of a first body of air, a second diaphragm defined chamber connected to a first humidity sensor for sensing the humidity of the first body of air, a third diaphragm defined chamber connected to a second temperature sensor for sensing the temperature of a second body of air, a fourth diaphragm defined chamber connected to a second humidity sensor for sensing the humidity of the second body of air, and an output mechanism responsive to the pressures within the first, second, third and fourth chambers for providing an output signal dependent upon the enthalpies of the first and second bodies of air. The areas of the diaphragm which define the first, second, third and fourth chambers may be sized so that the diaphragm module unit yields a fairly close approximation of the enthalpies of the first and second bodies of air.

BRIEF DESCRIPTION OF THE DRAWINGS

These and other features and advantages will become apparent from a detailed consideration of the drawings in which:

FIG. 3 shows a third embodiment of the invention in which a third diaphragm module unit is arranged as an enthalpy comparator;

FIG. 4 shows a unit such as that shown in FIG. 3 arranged as an enthalpy comparator and a second such unit to provide dry bulb temperature override;

DETAILED DESCRIPTION

Figure 1:
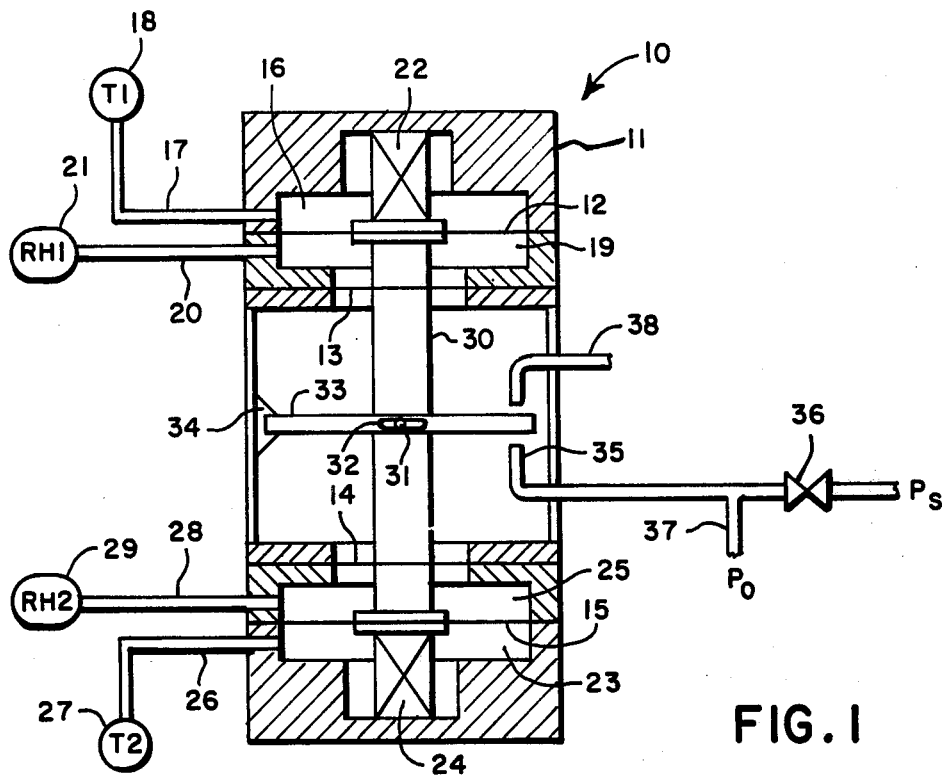
FIG. 1 shows a first embodiment of the invention in which a first diaphragm module unit is arranged as an enthalpy comparator.

In FIG. 1, diaphragm module unit 10 comprises housing 11 and diaphragms 12, 13, 14 and 15. Diaphragm 12 defines chamber 16 connected by pneumatic line 17 to first temperature sensor 18 for sensing the temperature of a first body of air such as the return air in an air conditioning system. Diaphragm 13 defines second chamber 19 connected by pneumatic line 20 to first humidity or relative humidity sensor 21 for sensing the humidity of the first body of air. Located within chamber 16 is biasing spring 22. The pressure supplied to chamber 16 by thermostat 18 creates a downward force on diaphragm 12. The pressure in chamber 19 supplied by humidity sensor 21 creates an upward force on diaphragm 12 and a smaller downward force on diaphragm 13.

Likewise, diaphragm 15 defines chamber 23 having biasing spring 24 therein. Diaphragm 14 defines chamber 25. Chamber 23 is connected by pneumatic line 26 to second temperature sensor 27 for sensing the temperature of a second body of air, such as outdoor air, and chamber 25 is connected by pneumatic line 28 to relative humidity or humidity sensor 29 for sensing the humidity of the second body of air. The pressure within chamber 23 supplied by thermostat 27 creates an upward force on diaphragm 15. The pressure within chamber 25 supplied by humidity sensor 29 creates a downward force on diaphragm 15 and a smaller upward force on diaphragm 14. The forces on diaphragms 12, 13, 14 and 15 are sensed by force transmitting member 30 which also receives the forces of biasing springs 22 and 24. Force transmitting member 30 will move in a direction and with a magnitude determined by the resulting forces acting on diaphragms 12 and 13 and the resulting forces acting on diaphragms 14 and 15.

Force transmitting member 30 is connected by pin 31 through slot 32 of lever 33 for moving the lever about pivot 34 with respect to nozzle 35. Nozzle 35 is connected to a source of supply pressure through restriction 36, and pneumatic line 37 is connected to the junction of nozzle 35 and restriction 36 for providing the output pressure. In addition, second nozzle 38 may be provided for reversing the action of the enthalpy comparator shown in FIG. 1.

As mentioned previously, a wet bulb temperature sensor can provide an output reasonably and linearly related to enthalpy. However, when humidity and temperature are sensed to provide an indication of enthalpy, the relationship is not linear.

The enthalpy of the first body of air can be reasonably approximated, particularly in the ranges useful for air conditioning control, by the following equation:

$$h_1 = 0.172 RH_1 + 0.551 T_1 - 21.55 \quad (1)$$

where $h_1$ is the enthalpy of the first body of air, $RH_1$ is the relative humidity of the first body of air, and $T_1$ is the dry bulb temperature of the first body of air. The enthalpy for the second body of air similarly can be given by the following formula:

$$h_2 = 0.172 RH_2 + 0.551 T_2 - 21.55 \quad (2)$$

where $h_2$ is the enthalpy of the second body of air, $RH_2$ is the relative humidity of the second body of air, and $T_2$ is the dry bulb temperature of the second body of air.

The comparator of FIG. 1 essentially then subtracts the enthalpies of the first and second bodies of air. Thus, this difference can be given by the following equation:

$$h_1 - h_2 = 0.172(RH_1 - RH_2) + 0.551(T_1 - T_2). \quad (3)$$

In order to determine the diaphragm ratio for the diaphragms of FIG. 1 to satisfy these equations, it may be assumed that the difference between the enthalpies of the first and second bodies of air is zero since the actual difference will not affect the area ratio and since, by assuming this difference to be zero, the calculations are simplified. If this difference is zero, then equation (3) reduces to the following:

$$RH_1 - RH_2 = -3.203(T_1 - T_2). \quad (4)$$

The forces acting on force transmitter 30 can be defined by the following equation:

$$P_{T1}A_1 + P_{RH1}A_2 + P_{RH2}A_1 = P_{RH1}A_1 + P_{RH2}A_2 + P_{T2}A_1 \quad (5)$$

where P is the pressure generated by the sensor indicated in the subscript, $A_1$ is the area of diaphragms 12 and 15, and $A_2$ is the area of diaphragms 13 and 14. Humidity sensors 21 and 29 may be Honeywell HP902 Sensors which experience a change in input pressure of 0.2 psi for each percent in relative humidity. Thus, the output pressure may be expressed by the formula $P_{RH} = 0.2 RH$. Temperature sensors 18 and 27 may be Honeywell LP914 Sensors which provide a 3-15 psi output for a 200° F. range and may be expressed by the equation $P_T = 0.06T$. Inserting these formulas into equation 5, this equation becomes the following:

$$(0.06T_1 + 0.2RH_2 - 0.2RH_1 - 0.6T_2)A_1 = (0.2RH_2 - 0.2RH_1)A_2. \quad (6)$$

Equation 6 reduces to the following:

$$\frac{A_2}{A_1} = -\frac{.06(T_1 - T_2)}{.2(RH_1 - RH_2)} + 1$$

Combining equation (4) into equation (7) $A_1 = 1.10 A_2$. Therefore, if diaphragms 12 and 15 of enthalpy comparator 10 are 1.10 times larger than diaphragms 13 and 14, enthalpy comparator 10 will yield a close approximation to the enthalpy difference of the first and second bodies of air. (It is to be noted that the area difference of diaphragms 12 and 13 as shown in FIG. 1 has been exaggerated for clarification.)

Moreover, for purposes of this calculation, springs 22 and 24 are assumed to exert equal but opposite forces on transmitter 30.

An alternative diaphragm module unit 50 is disclosed in FIG. 2 having housing 51 for providing the chambers connected to the various sensors as hereinafter described. Chamber 52 of housing 51 is connected by pneumatic line 53 to temperature sensor 54 which senses the temperature of the first body of air. Chamber 52 is defined by diaphragm 55. Chamber 56 is connected by pneumatic line 57 to humidity sensor 58 which senses the humidity of the second body of air. Chamber 56 is defined by diaphragms 59 and 60. Chamber 61 between diaphragms 55 and 60 is vented to atmosphere. Within chamber 52 is biasing spring 62 adjustable by nut 63 located within threaded neck 64 of housing 51. Plug 65 caps neck 64.

Chamber 66, defined by diaphragm 67, is connected by pneumatic line 68 to temperature sensor 69 which senses the temperature of the second body of air. Chamber 70 is defined by diaphragms 71 and 72 and is connected by pneumatic line 73 to humidity sensor 74 which senses the humidity of the first body of air. Within chamber 66 is biasing spring 75 adjustable by nut 76 within threaded neck 77 of housing 51. Plug 78 caps threaded neck 77.

Force transmitter 79 is responsive to the diaphragms 55, 59, 60, 67, 71 and 72 for transmitting the resultant forces of the pressures within chambers 52, 56, 66 and 70 to lever 80 pivoted at 81. Lever 80 operates in conjunction with nozzle 82 which is connected to a source of supply pressure through restriction 83. Pneumatic line 84, connected to the junction of restriction 83 and nozzle 82, provides the output pressure.

By properly selecting diaphragm area sizes and spring constant, enthalpy comparator 50 can be made to operate according to equation (3) to provide a close approximation of the difference in enthalpies between two bodies of air.

Enthalpy comparator 100 of FIG. 3, by properly selecting the diaphragm areas and lever ratios, can produce an output which closely approximates the difference in enthalpies between the first and second bodies of air. Enthalpy comparator 100 comprises housing 101 having chamber 102 defined by diaphragm 103, chamber 104 defined by diaphragm 105, chamber 106 defined by diaphragm 107 and chamber 108 defined by diaphragm 109. Chamber 102 is pneumatically connected to temperature sensor 110 for sensing the temperature of the second body of air, chamber 104 is pneumatically connected to sensor 111 for sensing the humidity of the second body of air, chamber 106 is pneumatically connected to humidity sensor 112 for sensing the humidity of the first body of air, and chamber 108 is pneumatically connected to sensor 113 for sensing the temperature of the first body of air. Pusher 114 senses movement of diaphragm 103 and operates against lever 115. Similarly, pusher 116 mechanically connects diaphragm 105 to lever 115, pusher 117 mechanically connects diaphragm 107 to lever 115 and pusher 118 mechanically connects diaphragm 109 to lever 115. Lever 115 is pivoted about housing 101 at pivot point 119. Biasing springs 120 and 121 operate against lever 115. Lever 115 has a valve operator 122 attached thereto for cooperating with nozzle 123 of housing 101. Nozzle 123 is connected through restriction 124 to a source of supply pressure. Output conduit 125 is connected to the junction of of nozzle 123 and restriction 124 for providing the output pressure.

The force equation for comparator 100 may be written as follows:

$$P_{T1}A_1b + P_{RH1}A_2a = P_{RH2}A_2a + P_{T2}A_1b \qquad (8)$$

where P is the pressure supplied by the sensor indicated by the subscript, $A_1$ is the area of diaphragms 103 and 109, $A_2$ is the area of diaphragms 105 and 107, a is the distance from pivot point 119 to the center of diaphragms 105 and 107, and b is the distance from pivot point 119 to the center of diaphragms 103 and 109. Since $P_T = 0.06T$ and $P_{RH} = 0.2RH$, equation (8) becomes $$0.06(T_1 - T_2)A_1b = -0.2(RH_1 - RH_2)A_2a. \qquad (9)$$

Using equation (4), equation (9) reduces to the following:

$$A_1 = 10.67(a/b)A_2. \qquad (10)$$

Therefore, by properly selecting the lever distances a and b and diaphragm areas $A_1$ and $A_2$ according to equation (10), comparator 100 can be made to operate according to equation (3).

Under certain conditions, even though the enthalpy difference between the first and second bodies of air suggests that the first body of air primarily should be used in the air conditioning system, the dry bulb temperature for that air may make it unsuitable for such use. The arrangement shown in FIG. 4 provides a dry bulb temperature override to the enthalpy comparator. Enthalpy comparator 100' of FIG. 4 is exactly the same as the enthalpy comparator 100 of FIG. 3. In addition, dry bulb temperature override 150 is provided which has its output conduit 151 connected to output conduit 125 for overriding the output pressure from enthalpy comparator 100. Output conduit 151 is connected to nozzle 123' of override unit 150. Override unit 150 is the same as enthalpy comparator unit 100 except that the chambers which are normally connected to the humidity sensors are vented to atmosphere. Thus, chamber 108' is connected to dry bulb temperature sensor 152 located in the first body of air and chamber 102' is connected to dry bulb temperature sensor 153 located in the second body of air.

Figure 5:
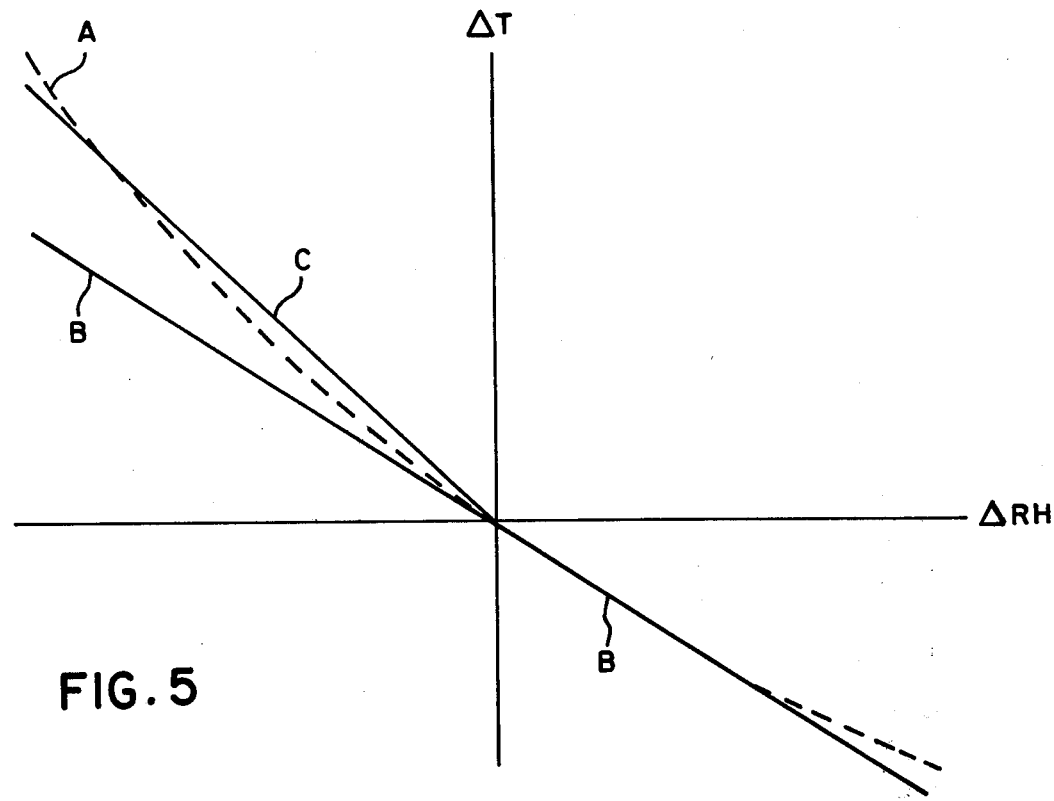
FIG. 5 is a graph showing the solid line approximation according to the invention and the actual dashed line $\Delta T$ vs. $\Delta RH$ curve taken along a constant enthalpy line from the psychrometric chart; and, FIG. 6 shows a diaphragm module unit for more closely approximating the dashed curve shown in FIG. 5.
Figure 6:
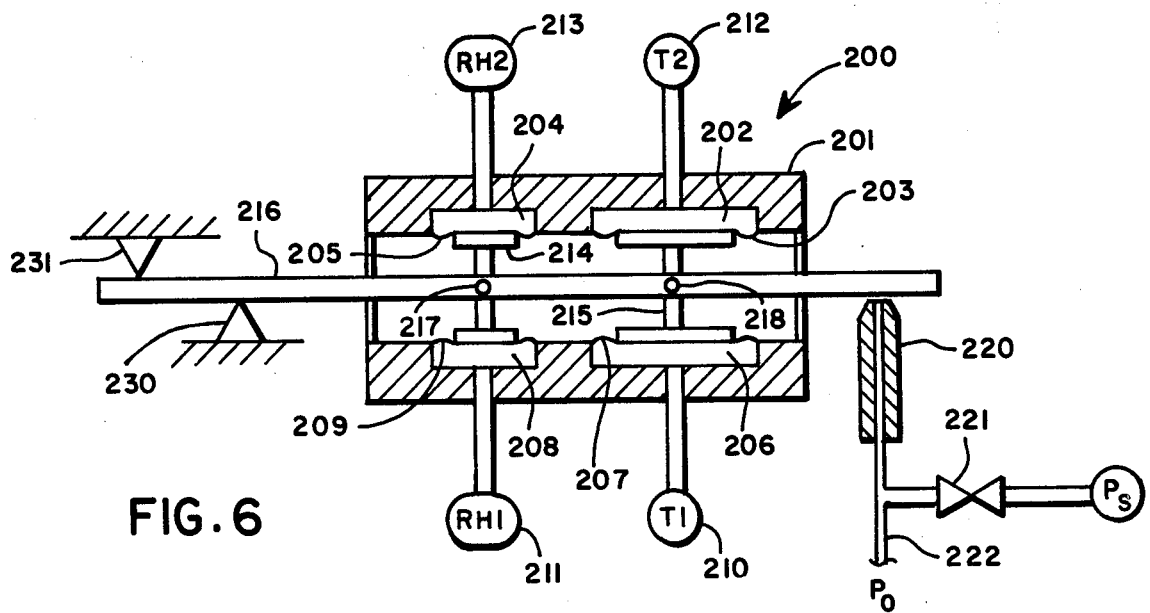

A device for more closely approximating the enthalpy difference of two bodies of air is disclosed in FIGS. 5 and 6. If ΔT, the difference between the temperatures of the first and second bodies of air, is plotted against ΔRH, the difference in relative humidities between the two bodies of air, along a constant enthalpy line of the psychrometric chart, the dashed line curve A of FIG. 5 will result. Solid line B of FIG. 5 represents the approximation curve according to equation 4 above. In the fourth quadrant, the approximation curve B is very close to the actual curve A; but the approximation curve B becomes more widely separated from the actual curve A in the second quadrant. In many applications, operation of the enthalpy comparator in the second quadrant may seldom be used. However, in those situations where it is desirable to operate the enthalpy comparator in the second quadrant, FIG. 5 demonstrates that it would be desirable to provide a two-slope device having a slope according to equation (4) in the fourth quadrant but a different slope, according to approximation curve C, in the second quadrant. The following equation yields a fairly close approximation to the curve A in the second quadrant:

$$RH_1 - RH_2 = -2.22(T_1 - T_2).$$

Enthalpy comparator 200 shown in FIG. 6 provides this two-slope control. Enthalpy comparator 200 comprises housing 201 having chamber 202 defined by diaphragm 203, chamber 204 defined by diaphragm 205, chamber 206 defined by diaphragm 207, and chamber 208 defined by diaphragm 209. Chamber 206 is connected to temperature sensor 210 and chamber 208 is connected to humidity sensor 211. Chamber 202 is connected to temperature sensor 212 and chamber 204 is connected to humidity sensor 213. Pusher 214 is operated on by diaphragms 205 and 209 and pusher 215 is operated on by diaphragms 203 and 207. Pushers 214 and 215 are connected to force transmitting lever 216 at pivot points 217 and 218 respectively. Force transmitting lever 216 operates in conjunction with nozzle 220 which is connected through restriction 221 to a source of supply pressure. Output line 222 is connected to the junction of nozzle 220 and restriction 221. As is well known, the distance of the lever 216 from the nozzle 220 will determine the output pressure in output line 222.

Force transmitting lever operates around first pivot 230 and second pivot 231. By properly selecting the diaphragm areas for diaphragms 203, 205, 207 and 209 and the point at which pivots 230 and 231 operate on the lever 216, the two-slope function can be provided according to the graph of FIG. 5.

The embodiments of the invention in which an exclusive property or right is claimed are defined as follows:

1. A fluidic enthalpy comparator for comparing the enthalpies of first and second bodies of air comprising:
   first and second temperature sensors for providing first and second respective pressures dependent upon the temperatures of respective first and second bodies of air;
   first and second humidity sensors for providing respective third and fourth pressures dependent upon the humidities of said respective first and second bodies of air;
   a diaphragm module unit having a first diaphragm defined chamber connected to said first temperature sensor for receiving said first pressure, a second diaphragm defined chamber connected to said second temperature sensor for receiving said second pressure, a third diaphragm defined chamber connected to said first humidity sensor for receiving said third pressure, and a fourth diaphragm defined chamber connected to said second humidity sensor for receiving said fourth pressure, and output means responsive to said pressures within said first, second, third and fourth diaphragm defined chambers for providing a proportional output signal dependent upon the enthalpies of said first and second bodies of air.

2. The comparator of claim 1 wherein said diaphragm module unit comprises a housing and diaphragm means defining said first, second, third and fourth chambers.

3. The comparator of claim 2 wherein said diaphragm means comprises diaphragms for defining said first, second, third and fourth chambers, said diaphragms having predetermined areas for substantially approximating the difference between said enthalpies.

4. The comparator of claim 3 wherein said diaphragms have areas to satisfy the equation:

$$h_1 - h_2 = 0.172(RH_1 - RH_2) + 0.551(T_1 - T_2)$$

where $h_1$ is the enthalpy of the first body of air, $h_2$ is the enthalpy of the second body of air, $RH_1$ is the humidity of the first body of air, $RH_2$ is the humidity of the second body of air, $T_1$ is the temperature of the first body of air and $T_2$ is the temperature of the second body of air.

5. The comparator of claim 4 wherein said diaphragm module unit further comprises means for allowing said comparator to operate according to the following formula when it is in its second quadrant of operation:

$$RH_1 - RH_2 = -2.22(T_1 - T_2).$$

6. The comparator of claim 3 wherein said diaphragms comprise a first diaphragm separating said first and third chambers, a second diaphragm for sealing said third chamber, a third diaphragm for sealing said fourth chamber and a fourth diaphragm for separating said second and fourth chambers.

7. The comparator of claim 6 wherein said output means comprises forces transmitting means mechanically connected to said first, second, third and fourth diaphragms, nozzle means operating in conjunction with said force transmitting means, said nozzle means being connected through a restriction to a source of supply pressure, and an output line connected to the junction of said nozzle means and said restriction for providing said output pressure.

8. The comparator of claim 7 wherein said first, second, third and fourth diaphragms have area sizes to satisfy the equation:

$$h_1 - h_2 = 0.172(RH_1 - RH_2) + 0.551(T_1 - T_2)$$

where $h_1$ is the enthalpy of the first body of air, $h_2$ is the enthalpy of the second body of air, $RH_1$ is the humidity of the first body of air, $RH_2$ is the humidity of the second body of air, $T_1$ is the temperature of the first body of air and $T_2$ is the temperature of the second body of air.

9. The comparator of claim 3 wherein said diaphragms comprise a first diaphragm for separating said first chamber and a fifth chamber vented to atmosphere, a second diaphragm separating said fifth chamber and said fourth chamber, a third diaphragm for sealing said fourth chamber, a fourth diaphragm for sealing said third chamber, a fifth diaphragm separating said third chamber from a sixth chamber vented to atmosphere and a sixth diaphragm for separating said sixth chamber from said second chamber.

10. The comparator of claim 9 wherein said output means comprises force transmitting means mechanically connected to said first, second, third, fourth, fifth and sixth diaphragms, nozzle means operating in conjunction with said force transmitting means, said nozzle means being connected through a restriction to a source of supply pressure, and an output line connected to the junction of said nozzle means and said restriction for providing said output pressure.

11. The comparator of claim 10 wherein said first, second, third, fourth, fifth and sixth diaphragms have area sizes to satisfy the following equation:

$$h_1 - h_2 = 0.172(RH_1 - RH_2) + 0.551(T_1 - T_2)$$

where $h_1$ is the enthalpy of the first body of air, $h_2$ is the enthalpy of the second body of air, $RH_1$ is the humidity of the first body of air, $RH_2$ is the humidity of the second body of air, $T_1$ is the temperature of the first body of air and $T_2$ is the temperature of the second body of air.

12. The comparator of claim 3 wherein said housing comprises an elongated housing and wherein said first, second, third and fourth chambers are formed by recesses in a first surface of said housing, said first chamber having a first diaphragm for covering said first chamber, said second chamber having a second diaphragm for covering said second chamber, said third chamber having a third diaphragm for covering said third chamber, and said fourth chamber having a fourth diaphragm for covering said fourth chamber, a force transmitter pivotally attached to said housing, said first, second, third, and fourth diaphragms being mechanically connected to said force transmitter means.

13. The comparator of claim 12 wherein said first, second, third and fourth chambers are axially aligned and wherein said third chamber is situated between said first chamber and said fourth chamber and said fourth chamber is situated between said third chamber and said second chamber and wherein said force transmitter is pivotally connected to said housing between said third and fourth chambers.

14. The comparator of claim 13 wherein said output means comprises nozzle means operating in conjunction with said force transmitter, said nozzle means being connected through a restriction to a source of supply pressure, and an output line connected to the junction of said nozzle means and said restriction for supplying said output pressure.

15. The comparator of claim 14 wherein said first, second, third and fourth diaphragms have an effective area and a lever distance defined by a distance between the pivot point and the point at which the diaphragm is mechanically connected to said force transmitter of magnitudes to satisfy the following equation:

$$h_1 - h_2 = 0.172(RH_1 - RH_2) + 0.551(T_1 - T_2)$$

where $h_1$ is the enthalpy of the first body of air, $h_2$ is the enthalpy of the second body of air, $RH_1$ is the humidity of the first body of air, $RH_2$ is the humidity of the second body of air, $T_1$ is the temperature of the first body of air and $T_2$ is the temperature of the second body of air.

16. The comparator of claim 3 wherein said output means comprises a force transmitter mechanically connected to said diaphragms for responding to the pressures in said chambers, nozzle means operating in conjunction with said force transmitting means, said nozzle means being connected through a restriction with a source of supply pressure, and an output line connected to the junction of said nozzle means and said restriction for supplying said output pressure.

17. The comparator of claim 16 wherein said diaphragms have areas to satisfy the equation:

$$h_1 - h_2 = 0.172(RH_1 - RH_2) + 0.551(T_1 - T_2)$$

where $h_1$ is the enthalpy of the first body of air, $h_2$ is the enthalpy of the second body of air, $RH_1$ is the humidity of the first body of air, $RH_2$ is the humidity of the second body of air, $T_1$ is the temperature of the first body of air and $T_2$ is the temperature of the second body of air.

18. The comparator of claim 1 wherein said output means comprises force transmitter means operationally associated with said first, second, third and fourth chambers, nozzle means for operating in conjunction with force transmitting means, said nozzle means being connected through a restriction to a source of supply pressure, and an output line connected to the junction of said nozzle means and said restriction for providing said output pressure.

19. The comparator of claim 1 further comprising an additional diaphragm module unit having a first diaphragm defined chamber connected to a third temperature sensor for sensing the temperature of said first body of air and a second diaphragm defined chamber connected to a fourth temperature sensor for sensing said temperature of said second body of air and output means associated with said first and second chambers of said additional diaphragm module unit and connected to said output means of said diaphragm module unit for providing an override function.

20. A fluidic enthalpy comparator for comparing the enthalpies of first and second bodies of air comprising:
first and second temperature sensors for providing first and second respective pressures dependent upon the temperature of said first and second bodies of air respectively;
first and second humidity sensors for providing respective third and fourth pressures dependent upon the humidities of said first and second bodies of air respectively;
a diaphragm module unit consisting of a housing, said housing having a first chamber connected to said first temperature sensor for receiving said first pressure, a second chamber connected to said second temperature sensor for receiving said second pressure, a third chamber connected to said first humidity sensor for receiving said third pressure, and a fourth chamber connected to said second humidity sensor for receiving said fourth pressure, diaphragms for defining said first, second, third and fourth chambers, said diaphragms having areas to satsify the formula $h_1 - h_2 = 0.172(RH_1 - RH_2) + 0.551(T_1 - T_2)$ where $h_1$ is the enthalpy of the first body of air, $h_2$ is the enthalpy of the second body of air, $RH_1$ is the humidity of the first body of air, $RH_2$ is the humidity of the second body of air, $T_1$ is the temperature of the first body of air and $T_2$ is the temperature of the second body of air, a force transmitter operatively associated with said diaphragms, a nozzle for operating in conjunction with said force transmitter to respond to said pressures within said first, second, third and fourth chambers, said nozzle providing an output signal dependent upon the difference between the enthalpies of said first and second bodies of air.

* * * * *

UNITED STATES PATENT AND TRADEMARK OFFICE
CERTIFICATE OF CORRECTION

PATENT NO. : 4,182,180

DATED : January 8, 1980

INVENTOR(S) : Richard C. Mott

It is certified that error appears in the above-identified patent and that said Letters Patent is hereby corrected as shown below:

The title page showing the illustrative Figure should be deleted to appear as per attached title page.

Figure 2:
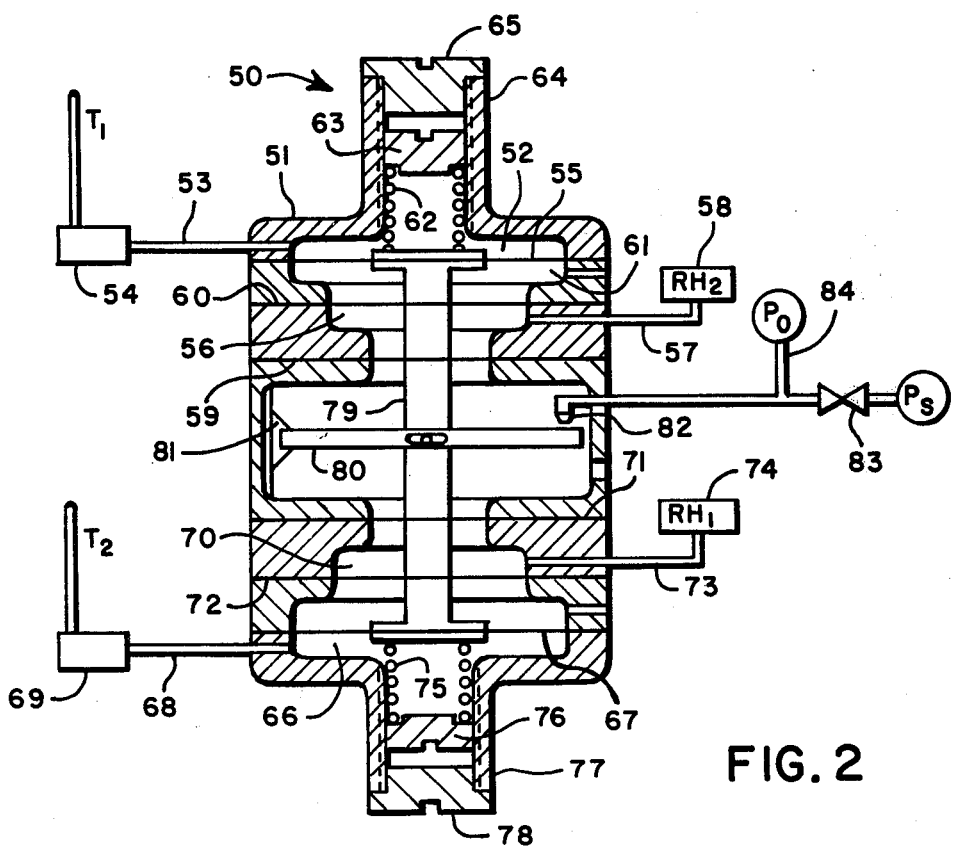
FIG. 2 shows a second embodiment of the invention in which a second diaphragm module unit is arranged as an enthalpy comparator.

Figures 1 and 2 should appear as shown on the attached sheets.

In the Specification, column 4, line 30, the sequence number for the equation is missing and should be corrected as follows:

$$\frac{A_2}{A_1} = -\frac{.06(T_1 - T_2)}{.2(RH_1 - RH_2)} + 1 \quad \text{should read} \quad \frac{A_2}{A_1} = -\frac{.06(T_1 - T_2)}{.2(RH_1 - RH_2)} + 1 \quad (7)$$

In the Specification, column 4, line 33, the equation "$A_1 = 1.10 A_2$" should read --$A_1 = .914 A_2$--.

In the Specification, column 4, line 35, "1.10 times larger" should read --.914 times smaller--.

United States Patent [19]

Mott

[11] 4,182,180
[45] Jan. 8, 1980

[54] ENTHALPY COMPARATOR

[75] Inventor: Richard C. Mott, Harwood Hts., Ill.

[73] Assignee: Honeywell Inc., Minneapolis, Minn.

[21] Appl. No.: 800,762

[22] Filed: May 26, 1977

[51] Int. Cl.² .............................................. G01K 17/00
[52] U.S. Cl. ................................ 73/336; 235/200 R; 236/44 C
[58] Field of Search ............. 73/336; 137/82; 165/16; 235/200 R, 200 WB, 201 ME; 236/44 C, 105

[56] References Cited

U.S. PATENT DOCUMENTS

| | | | |
|---|---|---|---|
| 2,494,673 | 1/1950 | Smith | 235/200 |
| 3,059,846 | 10/1962 | Vesper | 235/200 |
| 3,463,442 | 8/1969 | Lesklewicz et al. | 235/200 X |
| 3,913,344 | 10/1975 | Holloway et al. | 236/44 |

FOREIGN PATENT DOCUMENTS 121289  6/1959  U.S.S.R. ................................ 235/200

OTHER PUBLICATIONS

Mamzic, "Using Pneumatic Analog Computing Elements for Control" in Control Engineering, 9/61, pp. 105-110.

"12 Ways of Generating Control" in Control Engineering, 9/54, pp. 58-62.

Primary Examiner—Herbert Goldstein
Attorney, Agent, or Firm—Trevor B. Joike

[57] ABSTRACT

An enthalpy comparator for comparing the enthalpies of two bodies of air is disclosed having a first temperature sensor and a first humidity sensor for sensing the temperature and humidity respectively of the first body of air, a second temperature sensor and a second humidity sensor for sensing the temperature and humidity respectively of the second body of air, and a diaphragm module unit having a first diaphragm defined chamber connected to the first temperature sensor, a second diaphragm defined chamber connected to the second temperature sensor, a third diaphragm defined chamber connected to the first humidity sensor, and a fourth diaphragm defined chamber connected to the second humidity sensor, and an output sensing mechanism associated with the four chambers for providing an output dependent upon the enthalpies of the first and second bodies of air, and, in particular, the difference between the enthalpies of the first and second bodies of air. The areas of the diaphragms which define the first, second, third and fourth chambers are selected to yield a close approximation of the enthalpies of the two bodies of air.

20 Claims, 6 Drawing Figures

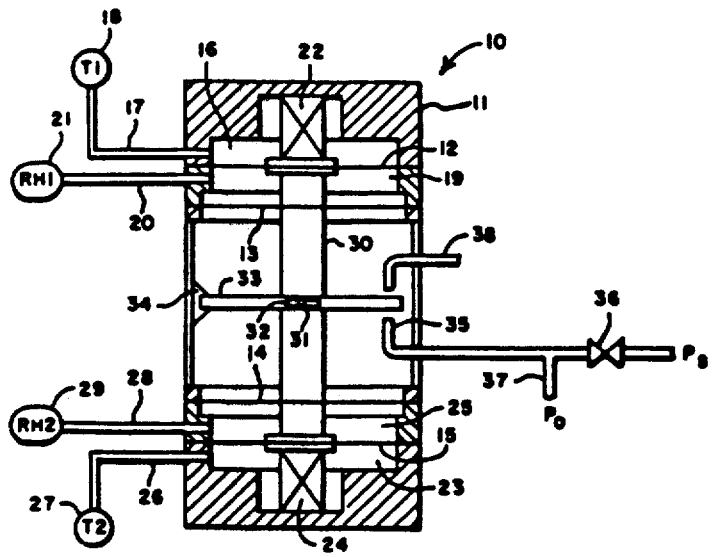

UNITED STATES PATENT OFFICE
CERTIFICATE OF CORRECTION

PATENT NO. : 4,182,180  Page 3 of 4
DATED : January 8, 1980
INVENTOR(S) : Richard C. Mott It is certified that error appears in the above-identified patent and that said Letters Patent are hereby corrected as shown below:

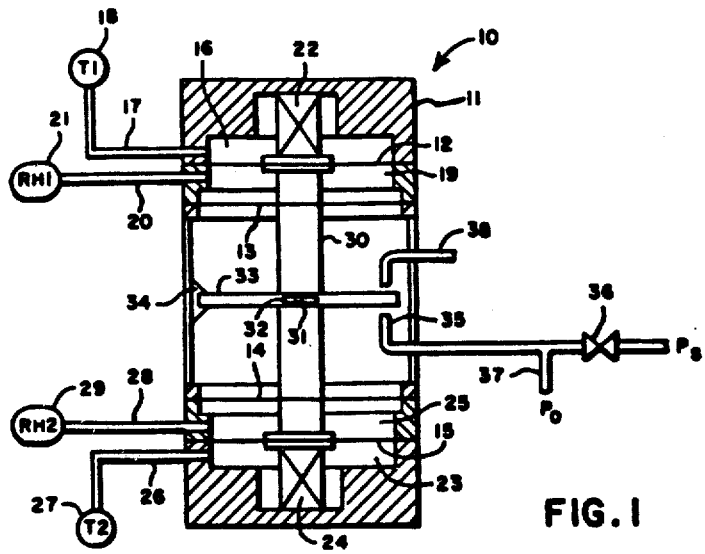

FIG. 1

UNITED STATES PATENT OFFICE
CERTIFICATE OF CORRECTION

PATENT NO. : 4,182,180

DATED : January 8, 1980

INVENTOR(S) : Richard C. Mott

It is certified that error appears in the above-identified patent and that said Letters Patent are hereby corrected as shown below:

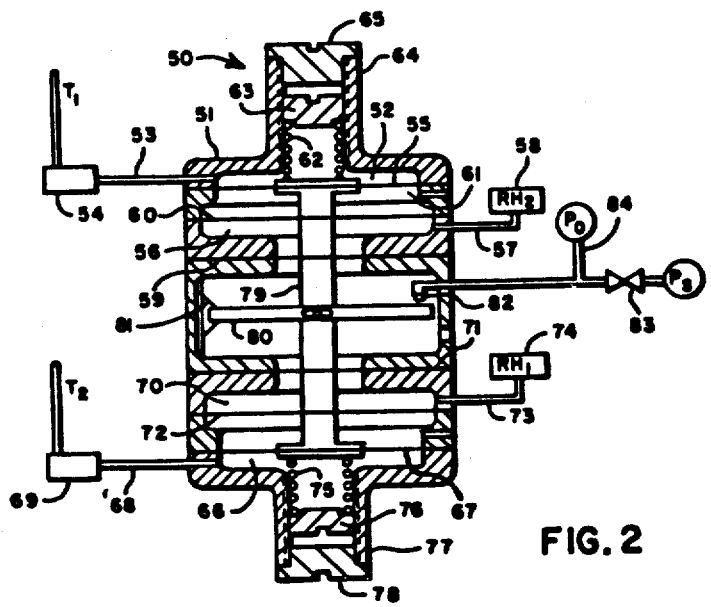

FIG. 2

Signed and Sealed this

Fifteenth Day of May 1984

[SEAL]

Attest:

GERALD J. MOSSINGHOFF

Attesting Officer     Commissioner of Patents and Trademarks